United States Patent [19]

Chane-Ching et al.

[11] Patent Number: 5,593,651
[45] Date of Patent: Jan. 14, 1997

[54] CONVERSION OF $SO_2$ GASEOUS EFFLUENTS INTO SOLUTIONS OF AMMONIUM OR ALKALI/ALKALINE EARTH METAL BISULFITES

[75] Inventors: Jean-Yves Chane-Ching, Eaubonne; Gerard Hustache, Roussillon; Jean-Louis Sabot, Laffitte, all of France

[73] Assignee: Rhone-Poulenc Chimie, Courbevoie Cedex, France

[21] Appl. No.: 404,926

[22] Filed: Mar. 16, 1995

[30] Foreign Application Priority Data

Mar. 16, 1994 [FR] France .................................. 94 03108

[51] Int. Cl.$^6$ .................................................. C01B 17/00
[52] U.S. Cl. ............................................................ 423/242.1
[58] Field of Search ........................................ 423/242.1

[56] References Cited

U.S. PATENT DOCUMENTS 3,644,087  2/1972  Urban ..................................... 23/25 Q
4,201,755  5/1980  Nofal ..................................... 423/242
4,834,959  5/1989  Kent et al. ............................. 423/242

FOREIGN PATENT DOCUMENTS 1540773  9/1968  France .
3007519  9/1980  Germany .

*Primary Examiner*—Janet C. Baxter
*Assistant Examiner*—Amy M. Harding
*Attorney, Agent, or Firm*—Burns, Doane, Swecker & Mathis, L.L.P.

[57] ABSTRACT

Gaseous effluents containing oxygen and no greater than 2% by volume of sulfur dioxide, $SO_2$, for example those emanating from facilities for the industrial-scale production of sulfuric acid, are converted into useful solutions of ammonium or of alkali or alkaline earth metal bisulfites, by first absorbing such gaseous effluent in a solution of ammonium or of an alkali or alkaline earth metal sulfite and bisulfite, at a pH ranging from 5 to 7, and, secondly, contacting the solution thus produced with an acidic reagent, advantageously a gaseous feedstream containing oxygen and greater than 2% by volume of sulfur dioxide, the $O_2/SO_2$ ratio by volume thereof being less than 5.

20 Claims, No Drawings

CONVERSION OF SO₂ GASEOUS EFFLUENTS INTO SOLUTIONS OF AMMONIUM OR ALKALI/ALKALINE EARTH METAL BISULFITES

BACKGROUND OF THE INVENTION

1. Field of the Invention

The present invention relates to the treatment of gaseous effluents low in sulfur dioxide content to provide solutions of ammonium or an alkali or alkaline earth metal bisulfite, and, more especially, to the treatment of gaseous effluents low in sulfur dioxide content to convert same into sodium bisulfite solutions.

2. Description of the Prior Art:

It is known to this art that certain industrial gaseous effluents, in particular those emanating from sulfuric acid production units, and more particularly from plants for the catalytic oxidation of sulfur dioxide, typically referred to as tail gases, contain a certain amount of sulfur dioxide.

A number of processes have been developed to reduce the concentration of sulfur dioxide in these effluents, which also contain oxygen.

Thus, in the so-called double absorption process, the gaseous mixture following combustion is subjected to a first catalytic oxidation step and a first absorption step, and then the residual gas, which is less rich in sulfur dioxide, is again oxidized and transferred to a second absorption column. While this process ensures that the discharged effluent contains about 0.03% by volume of sulfur dioxide, it requires special apparatus with attendant very high investment costs.

Absorbing sulfur dioxide contained in the tail gases into a basic medium, for example caustic soda solutions, is also known to this art. However, the highly basic pH and the low concentration of sulfur in these solutions comprehends that it is very difficult to add value to the final solutions obtained on an industrial scale.

Absorption of sulfur dioxide in a slightly basic medium has also been proposed to this art. However, this absorption is generally accompanied by oxidation of sulfur (+IV) into sulfur (+VI), i.e., formation of sodium (or ammonium) sulfate due to the high oxygen concentration in the tail gases. This process thus presents the drawback of generating a saline effluent from a gaseous effluent.

SUMMARY OF THE INVENTION

Accordingly, a major object of the present invention is the provision of an improved process for reducing the sulfur dioxide content of gaseous effluents comprised thereof to produce concentrated solutions of ammonium or of an alkali or alkaline earth metal bisulfite to which value can be added, notably because they do not contain a substantial amount of ammonium, or of an alkali or alkaline earth metal sulfate.

Briefly, the present invention features the treatment of gaseous effluents which are low in sulfur dioxide content, in particular containing less than 2% by volume of sulfur dioxide, and also containing oxygen, to provide solutions of ammonium or of an alkali or alkaline earth metal bisulfite, wherein a first step said effluent is absorbed into a solution of ammonium or of an alkali or alkaline earth metal sulfite and bisulfite at a pH ranging from 5 to 7 and, in a second step, at least a portion of the solution obtained from the first step is contacted with an acidic reagent.

DETAILED DESCRIPTION OF BEST MODE AND PREFERRED EMBODIMENTS OF THE INVENTION

More particularly according to the present invention, the gaseous effluent to be treated is low in sulfur dioxide content. It thus contains less than 2% by volume of sulfur dioxide, generally less than 1% by volume; this amount is, for example, at most 0.5% by volume, in particular at most 0.2% by volume.

The gaseous effluent also contains oxygen, generally at a high concentration. The $O_2/SO_2$ ratio by volume is thus generally greater than 5, for example greater than 20.

The first step of the process of the invention comprises absorbing the effluent in a solution of ammonium or of an alkali or alkaline earth metal sulfite and bisulfite.

Such absorption is affected in a solution of the sulfite and bisulfite of the element required to be contained in the bisulfite solution emanating from the process of the invention.

In particular, the absorption is carried out in a solution of sodium sulfite and bisulfite.

The pH of the ammonium or alkali or alkaline earth metal sulfite and bisulfite solution advantageously ranges from 5 to 7, preferably from 5.5 to 6.5.

The pH is generally maintained within these ranges during the first step of the subject process.

Preferably, this solution has a relatively high total concentration of ammonium or alkali or alkaline earth metal sulfite and bisulfite.

Thus, for a sodium sulfite and bisulfite solution, this concentration is generally at least 3 mol/l, for example from 3 to 5 mol/l.

During the first step of the process of the invention, it is preferable to maintain the ammonium or alkali or alkaline earth metal sulfite and bisulfite solution at a temperature (constant or otherwise) ranging from 20° C. to 70° C. This temperature advantageously ranges from 25° C. to 55° C.

The sulfite and bisulfite solution is such that the concentration of ammonium or alkali or alkaline earth metal sulfite is below the solubility limits thereof.

This solution can be adjusted by addition of a basic substance thereto formed by a solution of the hydroxide and/or carbonate of the same element as that employed in the sulfite and bisulfite solution of the first step.

Depending on the particular case, the basic substance is thus constituted by a solution of ammonium hydroxide and/or ammonium carbonate, a solution of alkali metal hydroxide (caustic soda in the case of sodium) and/or alkali metal carbonate, or by a solution of an alkaline earth metal hydroxide and/or an alkaline earth metal carbonate.

When the process is carried out to produce a sodium bisulfite solution, a caustic soda solution at a concentration of about 30% to 50% and/or a sodium carbonate solution at a concentration of about 20% to 30% can be used.

Optionally, the solution of ammonium or alkali or alkaline earth metal sulfite and bisulfite can be stirred during the first step. It may be sufficient to use a simple magnetic stirrer.

This first step is carried out in any suitable absorption apparatus. Thus, any suitable reactor or absorption column known to this art may be used.

The solution obtained from the first step is a solution of ammonium or alkali or alkaline earth metal sulfite and bisulfite containing a low concentration of ammonium or alkali or alkaline earth metal sulfate. This concentration is advantageously less than 30 g/l, preferably less than 20 g/l, for example 10 g/l.

Optionally, the gases emanating from the first step can be subjected to additional absorption in a solution of ammonium or alkali or alkaline earth metal hydroxide and/or carbonate, in particular caustic soda and/or sodium carbonate.

The second step of the process of the invention entails contacting at least a portion of the solution obtained from the first step with an acidic reagent.

The acidic reagent is preferably a sulfur dioxide-rich gas. It contains more than 2% by volume of sulfur dioxide, more particularly at least 5% by volume, for example at least 7% by volume.

This gas also contains oxygen, such that the volume ratio $O_2/O_2$ is generally less than 5, more particularly less than 2. Said ratio is about 1, for example.

Thus, the molar ratio of the $SO_2$ in the gas employed in the second step (sulfur dioxide-rich)/$S_2$ in the gaseous untreated starting effluent is more than 1, in particular more than 5. Said ratio can be more than 10, for example more than 30.

The sulfur dioxide-rich gas may have been produced by the sulfur oxidation furnace of a sulfuric acid production assembly.

The process of the invention not only effectively reduces the amount of sulfur dioxide contained in the gaseous starting effluent, but also provides a solution of ammonium or of an alkali or alkaline earth metal bisulfite to which value can be added, i.e., it corresponds to specifications for commercial solutions of ammonium or of an alkali or alkaline earth metal bisulfite.

In particular, a valorizable solution of sodium bisulfite can be obtained.

Thus, formation of ammonium or of an alkali or alkaline earth metal sulfate, in particular sodium sulfate (when preparing a sodium bisulfite solution), by oxidation of sulfur dioxide, is minimized.

The solution obtained from the second step is a solution of ammonium or of an alkali or alkaline earth metal bisulfite having a low concentration of the corresponding sulfate, i.e., the corresponding ammonium or alkali or alkaline earth metal sulfate. This concentration, in particular regarding sodium sulfate, is advantageously less than 30 g/l, preferably less than 20 g/l.

Preferably, the pH of the solution ranges from 3 to 5, in particular from 3.5 to 4.5.

It has a high concentration of ammonium or alkali or alkaline earth metal bisulfite.

Thus, in the case of a solution of ammonium or alkali metal bisulfite, in particular sodium bisulfite, this is advantageously greater than 3 mol/l, preferably greater than 4 mol/l.

In one embodiment of the present invention, for a solution of ammonium or alkali metal bisulfite, in particular sodium bisulfite, the amount of acidic agent employed, in particular sulfur dioxide-rich gas, is such that the solution obtained from the second step has a concentration of 5 to 5.5 mol/l of ammonium or alkali metal bisulfite, in particular sodium bisulfite when such a solution is prepared, and a pH of 4 to 4.5.

It will be appreciated that, when the acidic agent used in the second step is a sulfur dioxide-rich gas, the sulfur dioxide which is not absorbed in the second step can be recycled to the first step.

The process of the invention can be carried out continuously or batchwise.

It is of particular application for the treatment of gaseous effluents from sulfuric acid production units, the effluents therefrom being designated tail gases also.

In order to further illustrate the present invention and the advantages thereof, the following specific example is given, it being understood that same is intended only as illustrative and in nowise limitative.

EXAMPLE

The process of the invention was carried out in a scrubber comprising a cylindrical gas-tight reactor having a working capacity of about 1.5 liter. The surface area presented to the gas by the liquid was about 85 cm$^2$.

The reactor was provided with:

(a) a thermostatted chamber, to maintain the temperatures constant;

(b) a gas supply line for introducing a gaseous effluent containing sulfur dioxide and oxygen (the gaseous effluent was introduced close to the liquid surface in the scrubber via a conduit whose opening was positioned about 1 cm above the surface);

(c) a gas outlet line provided with a cooling system;

(d) a stirring system;

(e) a sealed inlet system for batchwise introduction of a volume of water to compensate for evaporation losses.

Two washers were situated in series downstream of the gas outlet from the scrubber, each containing 150 ml of caustic soda at a concentration of 5 mol/l, to trap all of the sulfur dioxide not absorbed in the scrubber.

In a first step, 240 ml of an aqueous solution containing sodium sulfite (1.65 mol/l), sodium bisulfite (2.29 mol/l) and sodium sulfate (0.023 mol/l) having a pH of 6.2 was introduced into the scrubber and maintained at a temperature of 50° C.

A gaseous effluent constituted by a mixture formed from an air stream of 99.825 l/h and a sulfur dioxide stream of 0.175 /l h, was circulated above the solution for a period of time of 6 hours.

To compensate for evaporation losses, 4 ml of water was introduced batchwise every hour for 5 hours, i.e., a total of 20 ml.

The solution obtained (234 ml) after 6 hours had a pH of 6.0 and the following composition:

(i) 2.95 mol/l of sodium bisulfite;

(ii) 1.37 mol/l of sodium sulfite; and (iii) 0.04 mol/l of sodium sulfate (i.e., 5.7 g/l).

The absorption yield from the scrubber (defined as the ratio of the number of moles of $SO_2$ effectively absorbed over the number of moles of $SO_2$ introduced into the scrubber), was 79%.

In a second step, 200 ml of the solution obtained were introduced into an identical reactor to that described above.

A gas constituted by a mixture of an air stream of 2.563 l/h and a stream of sulfur dioxide of 0.437 l/h was bubbled into this solution. This was carried out using a porous frit immersed in the solution.

Introduction of the gaseous effluent was continued for 10 hours.

To compensate for evaporation losses, 10 ml of water was introduced in 1 ml batches each hour.

The final solution obtained had a pH close to 4.5, a sodium bisulfite concentration on the order of 5.1 mol/l and a sodium sulfate concentration of 19 g/l.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the treatment of a gaseous effluent containing oxygen and no greater than 2% by volume of sulfur dioxide which comprises the steps of:
   (1) absorbing said gaseous effluent in a solution of ammonium sulfite and bisulfite or an alkali metal sulfite and bisulfite or an alkaline earth metal sulfite and bisulfite wherein the solution is at a pH of 5 to 7; and
   (2) contacting the solution thus produced with a gaseous feedstream containing oxygen and greater than 2% by volume of sulfur dioxide, the $O_2/SO_2$ ratio by volume thereof being less than 5, whereby said sulfur dioxide in the gaseous effluent is absorbed to produce a solution of ammonium bisulfite or an alkali metal bisulfite or an alkaline earth metal bisulfite.

2. The process as defined by claim 1, said starting gaseous effluent having an $O_2/SO_2$ ratio by volume of greater than 5.

3. The process as defined by claim 1, wherein in said first step the temperature of the solution of ammonium sulfite and bisulfite or an alkali metal sulfite and bisulfite or an alkaline earth metal sulfite and bisulfite ranges from 20° to 70° C.

4. The process as defined by claim 1, wherein in said first step the temperature of the solution of ammonium sulfite and bisulfite or an alkali metal sulfite and bisulfite or an alkaline earth metal sulfite and bisulfite ranges from 25° to 55° C.

5. The process as defined by claim 1, the respective solutions comprising aqueous solutions.

6. The process as defined by claim 1, comprising introducing a basic aqueous solution of ammonium hydroxide or ammonium carbonate or mixtures thereof into the ammonium sulfite and bisulfite solution of the first step.

7. The process as defined by claim 1, comprising introducing a basic aqueous solution of an alkali metal hydroxide or an alkali metal carbonate or mixtures thereof to the alkali metal sulfite and bisulfite solution of the first step.

8. The process as defined by claim 1, comprising introducing a basic aqueous solution of an alkaline earth metal hydroxide or an alkaline earth metal carbonate or mixtures thereof to the alkaline earth metal sulfite and bisulfite solution of the first step.

9. The process as defined by claim 1, wherein the solutions produced in the first and second steps thereof have a concentration of ammonium sulfate or an alkali metal sulfate or an alkaline earth metal sulfate of less than 30 g/l.

10. The process as defined by claim 9, said sulfate concentration being less than 20 g/l.

11. The process as defined by claim 1, the solution of ammonium bisulfite or an alkali metal bisulfite or an alkaline earth metal bisulfite obtained in said second step having a pH ranging from 3 to 5.

12. The process as defined by claim 1, said sulfite and bisulfite solution comprising a sodium sulfite and bisulfite aqueous solution having a total concentration of sodium sulfite and bisulfite of at least 3 mol/l.

13. The process as defined by claim 12, the solution of bisulfite obtained in said second step comprising an aqueous solution of sodium bisulfite having a sodium bisulfite concentration of greater than 3 mol/l.

14. The process as defined by claim 13, the solution of sodium bisulfite obtained in said second step having a pH ranging from 3 to 5 and a sodium sulfate concentration of less than 30 g/l.

15. The process as defined by claim 14, said sodium sulfate concentration being less than 20 g/l.

16. The process as defined by claim 1, said gaseous effluent comprising less than 1% by volume of sulfur dioxide.

17. The process as defined by claim 16, said gaseous effluent comprising at most 0.5% by volume of sulfur dioxide.

18. The process as defined by claim 1, said gaseous effluent emanating from a facility for the industrial production of sulfuric acid.

19. The process as defined by claim 1, wherein sulfur dioxide not absorbed in said second step is recycled to said first step.

20. A process for the treatment of a gaseous effluent containing oxygen and no greater than 2% by volume of sulfur dioxide which comprises the steps of:
   (1) absorbing said gaseous effluent in a solution of ammonium sulfite and bisulfite or an alkali metal sulfite and bisulfite or an alkaline earth metal sulfite and bisulfite wherein the solution is at a pH of 5 to 7; and
   (2) contacting the solution thus produced with a gaseous reagent containing more than 2% by weight sulfur dioxide, whereby said sulfur dioxide in the gaseous effluent is absorbed to produce a solution which comprises ammonium bisulfite or an alkali metal bisulfite or an alkaline earth metal bisulfite.

* * * * *